(12) United States Patent
Bian

(10) Patent No.: US 12,038,615 B2
(45) Date of Patent: Jul. 16, 2024

(54) EDGE COUPLERS WITH CONSECUTIVELY-ARRANGED TAPERS

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 25 days.

(21) Appl. No.: 17/701,918

(22) Filed: Mar. 23, 2022

(65) Prior Publication Data
US 2023/0305240 A1   Sep. 28, 2023

(51) Int. Cl.
   *G02B 6/42*   (2006.01)
(52) U.S. Cl.
   CPC .............. *G02B 6/4203* (2013.01); *G02B 6/42* (2013.01)
(58) Field of Classification Search
   CPC ................................ G02B 6/42; G02B 6/4203
   See application file for complete search history.

(56) References Cited

U.S. PATENT DOCUMENTS

| | | | |
|---|---|---|---|
| 10,126,500 B2 | 11/2018 | Qi et al. | |
| 10,197,731 B2 | 2/2019 | Teng et al. | |
| 10,269,379 B1* | 4/2019 | Goggin | G11B 5/012 |
| 10,393,967 B2* | 8/2019 | Piazza | G02B 6/12002 |
| 10,641,956 B1* | 5/2020 | Bian | G02B 6/43 |
| 10,641,959 B1* | 5/2020 | Park | G02B 6/1228 |
| 10,816,725 B2* | 10/2020 | Bian | G02B 6/125 |
| 2015/0293299 A1* | 10/2015 | Xu | G02B 6/1228 385/28 |
| 2017/0017034 A1 | 1/2017 | Painchaud et al. | |
| 2019/0154919 A1 | 5/2019 | Teng et al. | |
| 2019/0243066 A1 | 8/2019 | Mahgerefteh et al. | |

OTHER PUBLICATIONS

Bian, Yusheng, "Edge Couplers Including a Metamaterial Layer" filed on Mar. 23, 2022 as a U.S. Appl. No. 17/701,942.
Pavel Cheben et al., "Refractive index engineering with subwavelength gratings for efficient microphotonic couplers and planar waveguide multiplexers," Optics Letter 35, 2526-2528 (2010).
T. Barwicz et al., "An o-band metamaterial converter interfacing standard optical fibers to silicon nanophotonic waveguides," 2015 Optical Fiber Communications Conference and Exhibition (OFC), pp. 1-3, doi: 10.1364/OFC.2015.Th3F.3 (2015).
M. Teng et al., "Trident Shape SOI Metamaterial Fiber-to-Chip Edge Coupler," 2019 Optical Fiber Communications Conference and Exhibition (OFC), pp. 1-3, Tu2J.6 (2019).

(Continued)

*Primary Examiner* — Sung H Pak
*Assistant Examiner* — Hoang Q Tran
(74) *Attorney, Agent, or Firm* — Thompson Hine LLP; Anthony Canale

(57) ABSTRACT

Structures for an edge coupler and methods of fabricating such structures. The structure includes a substrate, a first waveguide core, and a second waveguide core positioned in a vertical direction between the first waveguide core and the substrate. The second waveguide core includes a taper and an inverse taper longitudinally positioned adjacent to the taper.

19 Claims, 11 Drawing Sheets

(56) References Cited

OTHER PUBLICATIONS

Kuanping Shang et al., "Silicon nitride tri-layer vertical Y-junction and 3D couplers with arbitrary splitting ratio for photonic integrated circuits," Opt. Express 25, 10474-10483 (2017).
R. S. Tummidi and M. Webster, "Multilayer Silicon Nitride-Based Coupler Integrated into a Silicon Photonics Platform with <1 dB Coupling Loss to a Standard SMF over O, S, C and L Optical Bands," 2020 Optical Fiber Communications Conference and Exhibition (OFC), pp. 1-3, Th2A. 10 (2020).
Mu, Xin & Wu, Sailong & Cheng, Lirong & Fu, H. Y. Edge Couplers in Silicon Photonic Integrated Circuits: A Review. Applied Sciences. 10. 1538. 10.3390/app10041538 (2020).
Martin Papes et al., "Fiber-chip edge coupler with large mode size for silicon photonic wire waveguides," Opt. Express 24, 5026-5038 (2016).
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, doi: 10.1109/JSTQE.2019.2908790.
Y. Bian et al., "3D Integrated Laser Attach Technology on 300-mm Monolithic Silicon Photonics Platform," 2020 IEEE Photonics Conference (IPC), pp. 1-2, doi: 10.1109/IPC47351.2020.9252280 (2020).
B. Peng et al., "A CMOS Compatible Monolithic Fiber Attach Solution with Reliable Performance and Self-alignment," in Optical Fiber Communication Conference (OFC), OSA Technical Digest (Optica Publishing Group, 2020), paper Th3I.4 (2020).
Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).
M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).
Bian, Yusheng et al., "Edge Couplers in the Back-End-of-Line Stack of a Photonics Chip" filed on Jan. 19, 2021 as a U.S. Appl. No. 17/151,955.
Bian, Yusheng et al., "Metamaterial Edge Couplers in the Back-End-of-Line Stack of a Photonics Chip" filed on Feb. 11, 2021 as a U.S. Appl. No. 17/173,639.
Bian, Yusheng, "Metamaterial Layers for Use With Optical Components" filed on Mar. 2, 2022 as a U.S. Appl. No. 17/684,840.
Taiwan Intellectual Property Office, Office Action and Search Report issued in Taiwanese Patent Application No. 112106730 on May 29, 2024; 15 pages.

\* cited by examiner

EDGE COUPLERS WITH CONSECUTIVELY-ARRANGED TAPERS

BACKGROUND

The disclosure relates to photonics chips and, more specifically, to structures for an edge coupler and methods of fabricating such structures.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is commonly used for coupling light of a given mode from a light source, such as a laser or an optical fiber, to optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected to another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Conventional edge couplers may be susceptible to significant leakage loss of light to the substrate during use. The leakage loss may include a contribution from the mismatch between the large mode size and the small dimensions of the tip of the edge coupler. The leakage loss may be particularly high when coupling light of the transverse magnetic polarization mode from a single-mode optical fiber to a silicon nitride waveguide core.

Improved structures for an edge coupler and methods of fabricating such structures are needed.

SUMMARY

In an embodiment of the invention, a structure for an edge coupler is provided. The structure includes a substrate, a first waveguide core, and a second waveguide core positioned in a vertical direction between the first waveguide core and the substrate. The second waveguide core includes a taper and an inverse taper longitudinally positioned adjacent to the taper.

In an embodiment of the invention, a method of forming a structure for an edge coupler is provided. The method includes forming a first waveguide core and forming a second waveguide core positioned in a vertical direction between the first waveguide core and the substrate. The second waveguide core includes a taper and an inverse taper longitudinally positioned adjacent to the taper.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
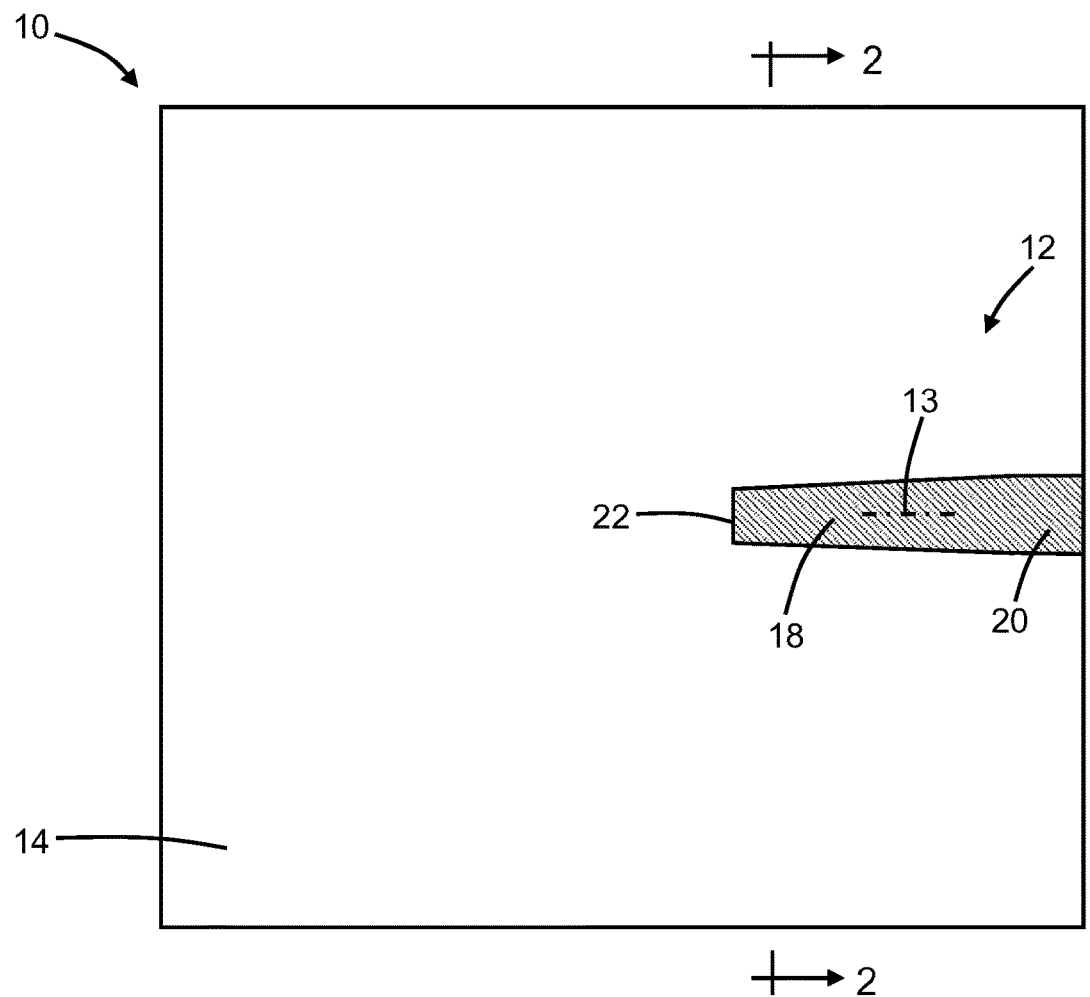
FIG. 1 is a top view of a structure at an initial fabrication stage of a processing method in accordance with embodiments of the invention.
Figure 2:
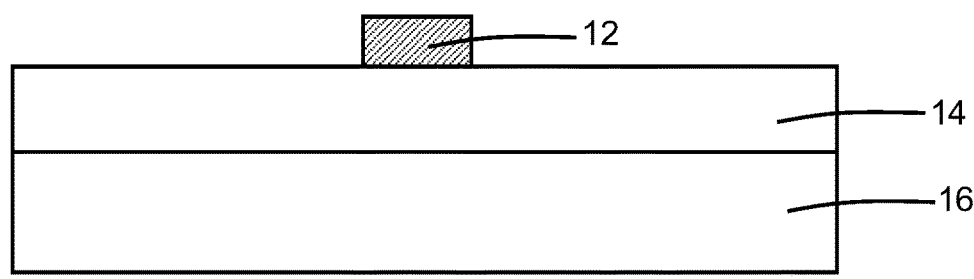
FIG. 2 is a cross-sectional view taken generally along line 2-2 in FIG. 1.

With reference to FIGS. 1, 2 and in accordance with embodiments of the invention, a structure 10 for an edge coupler includes a waveguide core 12 that is positioned over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, an additional dielectric layer comprised of a dielectric material, such as silicon dioxide, may be positioned between the dielectric layer 14 and the waveguide core 12.

The waveguide core 12 may be aligned along a longitudinal axis 13. The waveguide core 12 may include an inverse taper 18, a section 20 connected to the inverse taper 18, and an end surface 22 that terminates the inverse taper 18. An inverse taper refers to a tapered section of a waveguide core characterized by a gradual increase in width along a mode propagation direction. In that regard, the inverse taper 18 increases in width with increasing distance along the longitudinal axis 13 from the end surface 22. The section 20 of the waveguide core 12 may be connected to other optical components.

The waveguide core 12 may be comprised of a dielectric material, such silicon nitride, having a refractive index greater than the refractive index of silicon dioxide. In an alternative embodiment, the waveguide core 12 may be comprised of silicon oxynitride. In an embodiment, the waveguide core 12 may be formed by depositing a layer of its constituent material by chemical vapor deposition on the dielectric layer 14 and patterning the deposited layer by lithography and etching processes.

Figure 3:
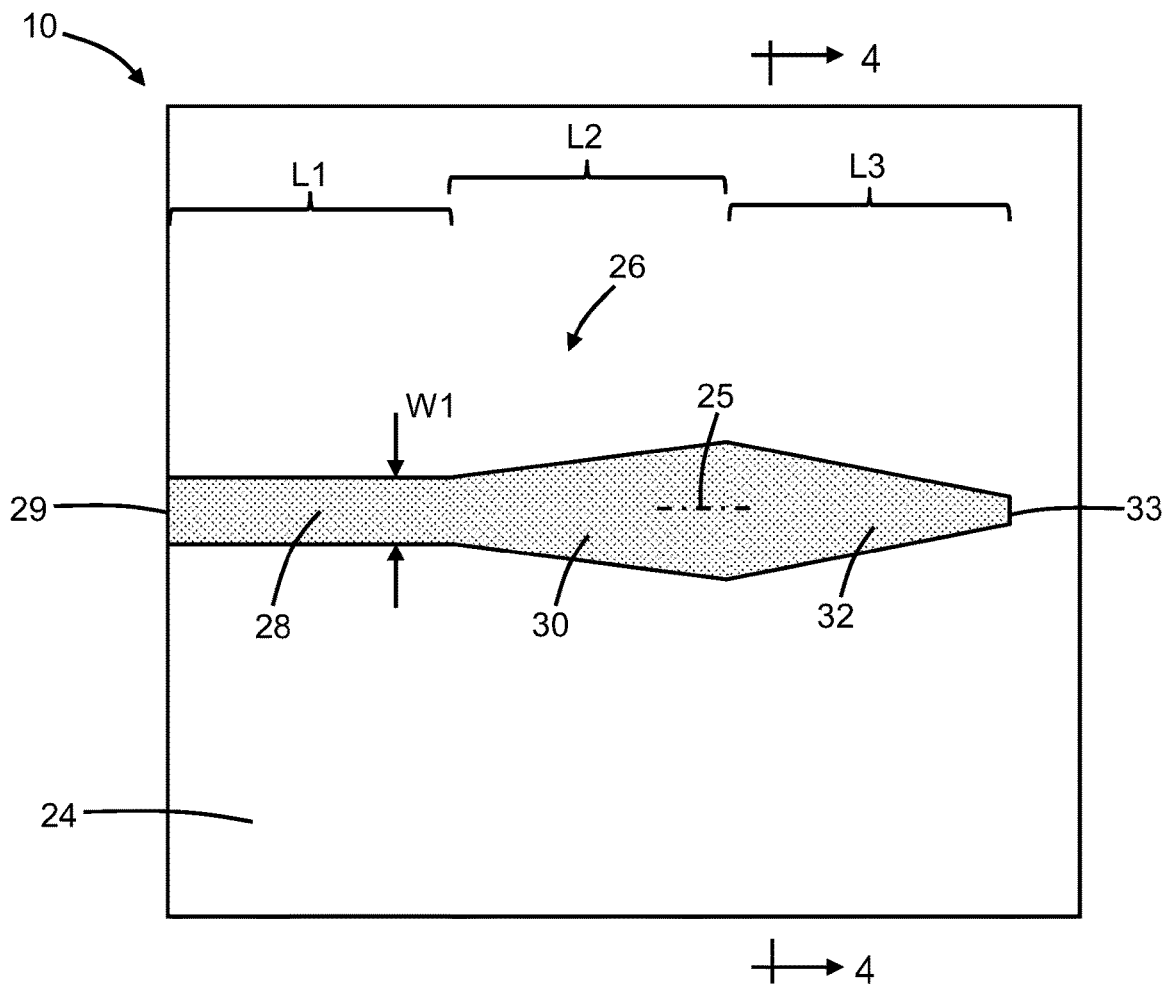
FIG. 3 is a top view of the structure at a fabrication stage of the processing method subsequent to FIG. 1.
Figure 4:
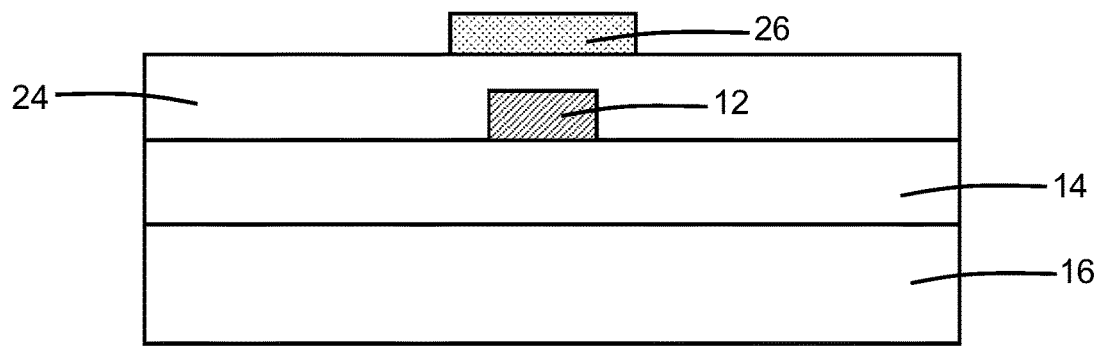
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, a dielectric layer 24 is formed over the waveguide core 12. The dielectric layer 24 may be comprised of a dielectric material, such as silicon dioxide. The waveguide core 12 is embedded in the dielectric layer 24 because the dielectric layer 24 is thicker than the height of the waveguide core 12. The thickness of the dielectric layer 24 and the height of the waveguide core 12 may be adjustable variables. The dielectric material constituting the dielectric layer 24 may have a lower refractive index than the dielectric material constituting the waveguide core 12.

A multiple-taper waveguide core 26 is formed on the dielectric layer 24. The waveguide core 26 may include a section 28, an inverse taper 30, and a taper 32 that may be connected by the inverse taper 30 to the section 28. The section 28 has an end surface 29 that terminates the waveguide core 26 and the taper 32 also has an end surface 33 that terminates the waveguide core 26. The waveguide core 26 has a width W1 that varies over its total length between the end surface 29 and the end surface 33. The section 28 may have a length L1 and the width W1 may be constant over the length L1, the inverse taper 30 may have a length L2 and the width W1 may increase over the length L2 with increasing distance from the section 28, and the taper 32 may have a length L3 and the width W1 may decrease over the length L3 with increasing distance from the section 28. The total length of the waveguide core 26 between the opposite end surfaces 29, 33 may be equal to the sum of the length L1, the length L2, and the length L3.

The waveguide core 26 may be comprised of a dielectric material, such as silicon-carbon nitride or hydrogenated silicon-carbon nitride, having a refractive index greater than the refractive index of silicon dioxide. In an alternative embodiment, the waveguide core 26 may be comprised of silicon nitride or silicon oxynitride. In an embodiment, the waveguide core 26 may be formed by depositing a layer of its constituent material by chemical vapor deposition on the dielectric layer 24 and patterning the deposited layer by lithography and etching processes. In an alternative embodiment, a slab layer may be connected to a lower portion of the waveguide core 26 over all or a portion of its length. The slab layer may be formed when the waveguide core 26 is patterned, and the slab layer, which is positioned on the dielectric layer 24, has a thickness that is less than the thickness of the waveguide core 26.

The waveguide core 26 may be aligned along a longitudinal axis 25. The inverse taper 30 is longitudinally positioned adjacent to the taper 32 such that back-to-back or consecutive tapers are provided as tapered sections of the waveguide core 26. In an embodiment, the inverse taper 30 may be adjoined (i.e., attached) to the taper 32. The inverse taper 30 tapers along the longitudinal axis 25 in an opposite direction from the tapering of the taper 32. In an embodiment, the longitudinal axis 25 of the waveguide core 26 may be aligned parallel to the longitudinal axis 13 of the waveguide core 12.

The waveguide core 12 is positioned in a vertical direction between a portion of the waveguide core 26 and the substrate 16. In an embodiment, the substrate 16 may be solid beneath the waveguide core 12. In an embodiment, the taper 32 of the waveguide core 26 may overlap with the inverse taper 18 of the waveguide core 12. In an embodiment, the taper 32 of the waveguide core 26 and the inverse taper 18 of the waveguide core 12 may have equal lengths. In an embodiment, the taper 32 of the waveguide core 26 may overlap with the inverse taper 18 of the waveguide core 12, and the taper 32 of the waveguide core 26 and the inverse taper 18 of the waveguide core 12 may have equal lengths. In an embodiment, the taper 32 of the waveguide core 26 may be centered over the inverse taper 18 of the waveguide core 12. In an embodiment, the inverse taper 30 of the waveguide core 26 may have a non-overlapping relationship with the waveguide core 12. In an embodiment, the inverse taper 18 of the waveguide core 12 may be lengthened such that the end surface 22 of the waveguide core 12 is aligned with the end surface 29 of the waveguide core 28, which results in the section 28, the inverse taper 30, and the taper 32 overlapping with the waveguide core 12.

Figure 5:
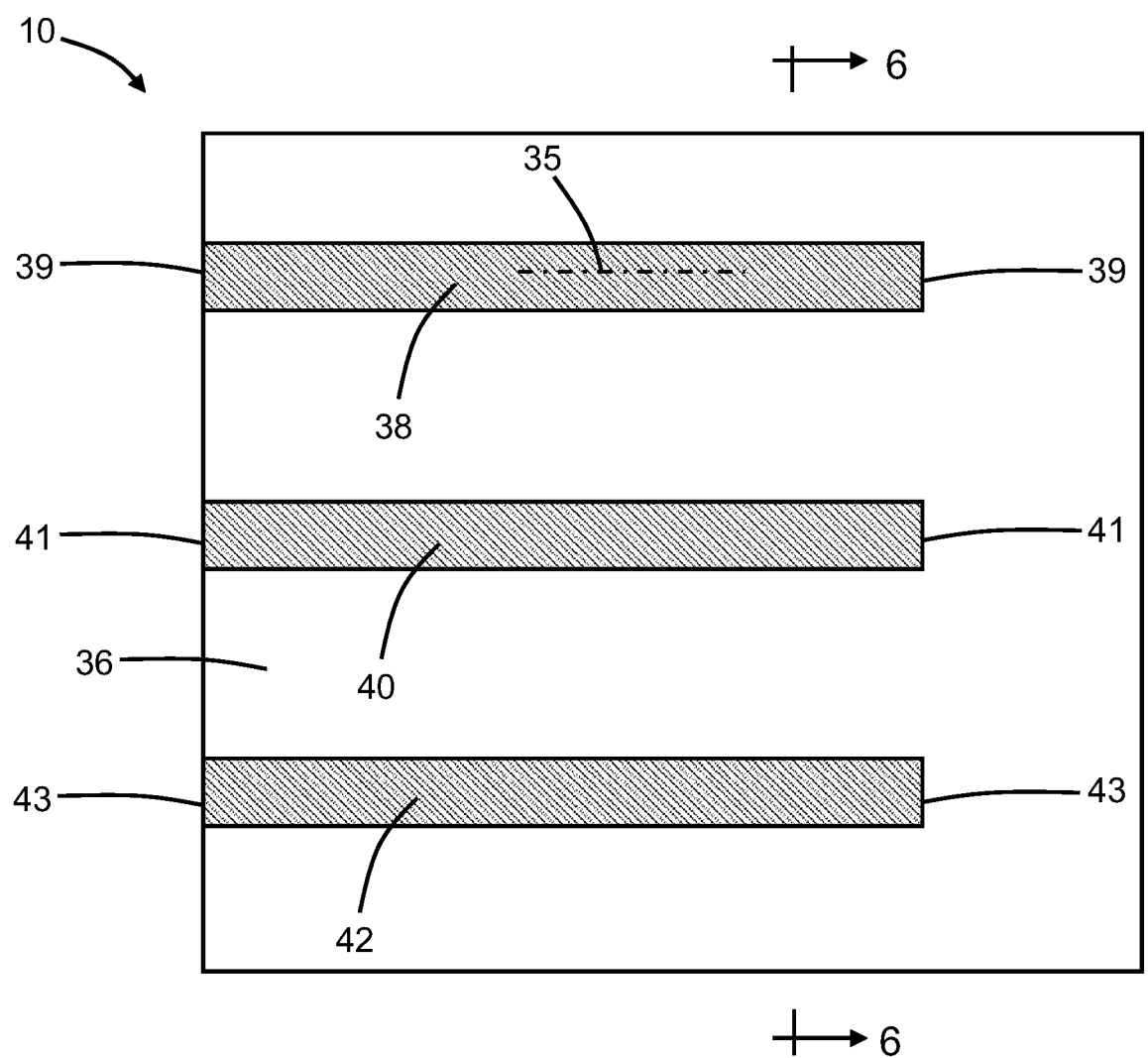
FIG. 5 is a top view of the structure at a fabrication stage of the processing method subsequent to FIG. 3.
Figure 6:
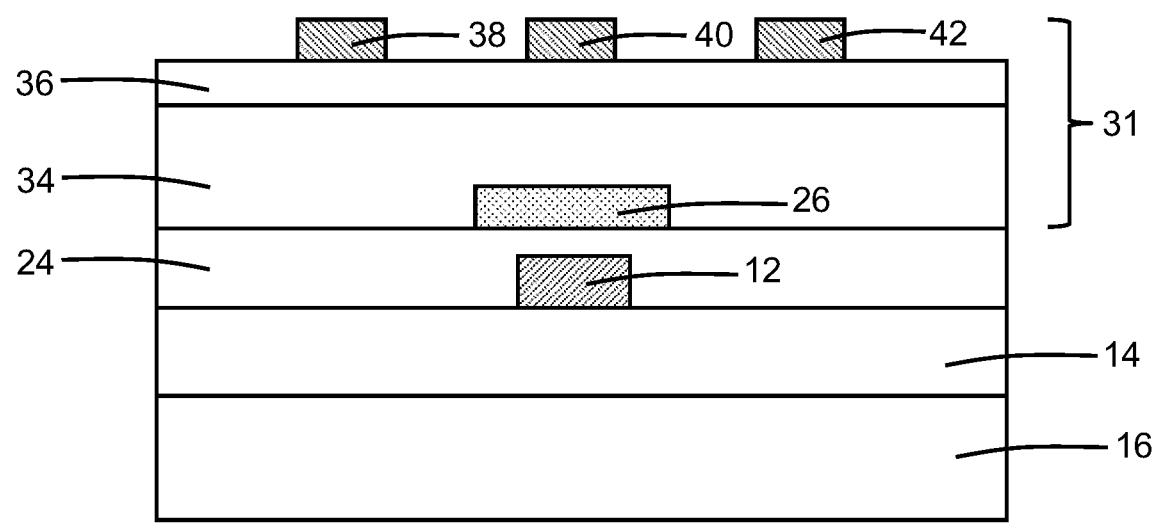
FIG. 6 is a cross-sectional view taken generally along line 6-6 in FIG. 5.

With reference to FIGS. 5, 6 in which like reference numerals refer to like features in FIGS. 3, 4 and at a subsequent fabrication stage, dielectric layers 34, 36 of a back-end-of-line stack 31 may be formed over the dielectric layer 24 and waveguide core 26. The waveguide core 26 is embedded in the dielectric layer 34. The dielectric layers 34, 36 may be comprised of a dielectric material, such as silicon dioxide, tetraethylorthosilicate silicon dioxide, or fluorinated-tetraethylorthosilicate silicon dioxide.

The edge coupler may include additional waveguide cores 38, 40, 42 that are formed in a level of the back-end-of-line stack 31 over the waveguide core 26. The waveguide cores 38, 40, 42 have a laterally-spaced juxtaposed arrangement on the dielectric layer 36. The waveguide cores 38, 40, 42 may be comprised of a dielectric material, such as silicon nitride, having a refractive index greater than the refractive index of silicon dioxide. In an embodiment, the waveguide cores 38, 40, 42 may be formed by depositing a layer of its constituent material by chemical vapor deposition on the dielectric layer 34 and patterning the deposited layer by lithography and etching processes. In an embodiment, the waveguide cores 38, 40, 42 may be comprised of a different dielectric material than the waveguide core 26. In an embodiment, the waveguide cores 38, 40, 42 may be comprised of a dielectric material that lacks carbon in its composition.

Each of the waveguide cores 38, 40, 42 may be aligned along a longitudinal axis 35. The waveguide core 38 may be truncated at opposite ends 39 to define a length for the waveguide core 38, the waveguide core 40 may be truncated at opposite ends 41 to define a length for the waveguide core 40, and the waveguide core 40 may be truncated at opposite ends 43 to define a length for the waveguide core 38. The waveguide core 40 is laterally positioned between the waveguide core 38 and the waveguide core 42, and the waveguide core 40 may overlap with the waveguide core 26. In an embodiment, the waveguide cores 38, 40, 42 may be laterally positioned with a symmetrical arrangement relative to the waveguide core 26.

In an alternative embodiment, the peripheral waveguide core 38 may curve away from the central waveguide core 40 such that the distance between the waveguide core 38 and the waveguide core 40 increases with decreasing distance from the waveguide core 12, and the peripheral waveguide core 42 may curve away from the central waveguide core 40 in an opposite direction of curvature than the waveguide core 38 such that the distance between the waveguide core 42 and the waveguide core 40 increases with decreasing distance from the waveguide core 12.

Figure 7:
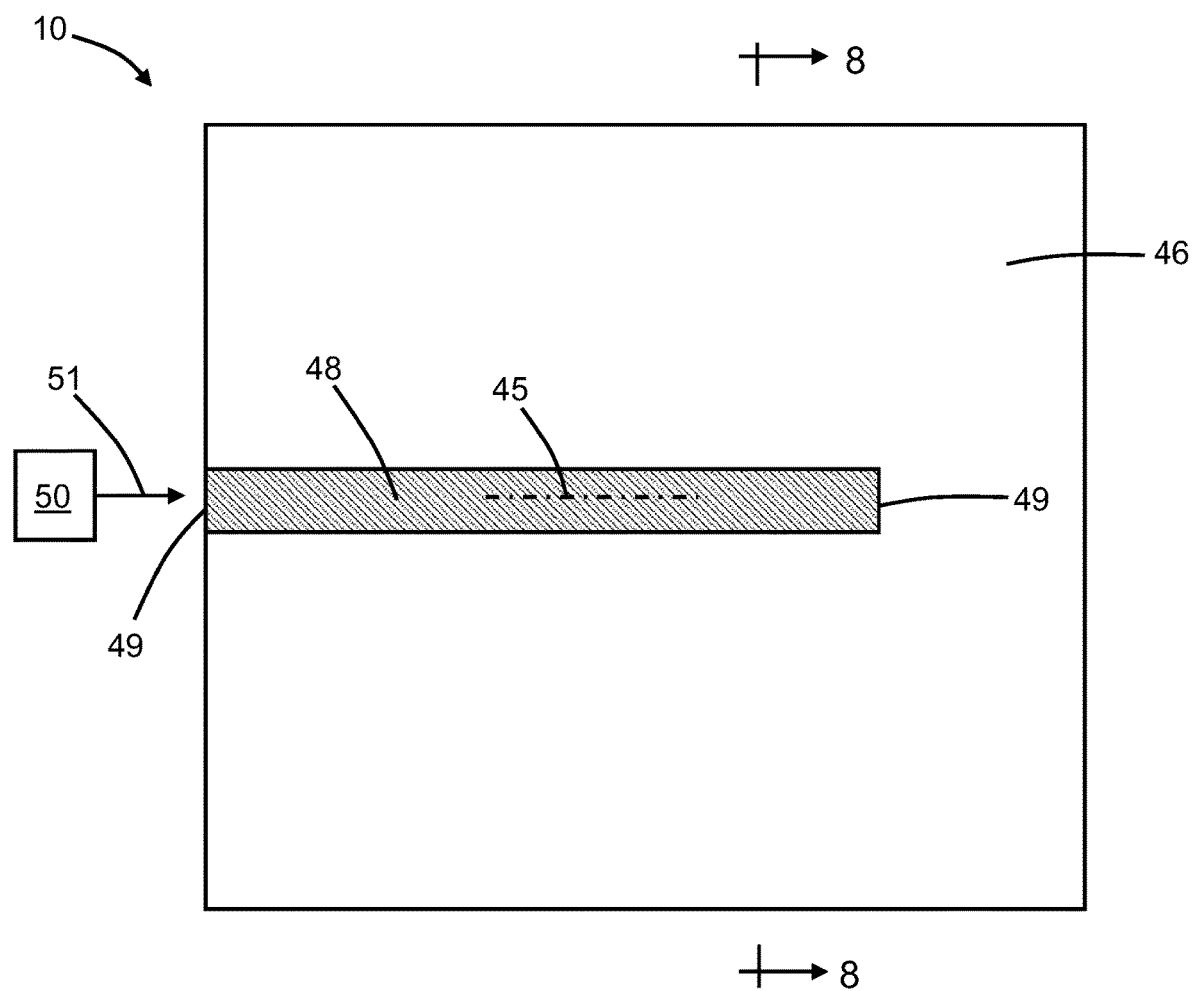
FIG. 7 is a top view of the structure at a fabrication stage of the processing method subsequent to FIG. 5.
Figure 8:
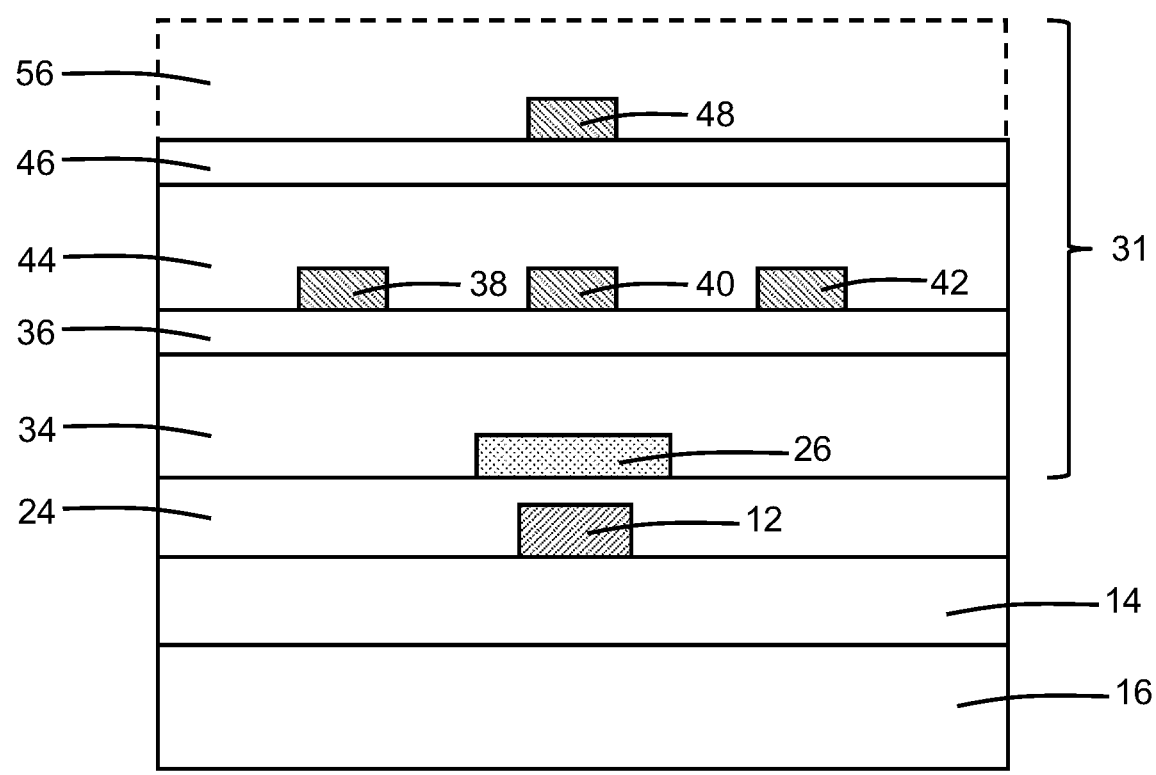
FIG. 8 is a cross-sectional view taken generally along line 8-8 in FIG. 7.

With reference to FIGS. 7, 8 in which like reference numerals refer to like features in FIGS. 5, 6 and at a subsequent fabrication stage, dielectric layers 44, 46 of the back-end-of-line stack 31 may be formed over the waveguide cores 38, 40, 42. The dielectric layers 44, 46 may be comprised of a dielectric material, such as silicon dioxide, tetraethylorthosilicate silicon dioxide, or fluorinated-tetraethylorthosilicate silicon dioxide. The waveguide cores 38, 40, 42 are embedded in the dielectric layer 44.

The edge coupler may include a waveguide core 48 that is formed in a level of the back-end-of-line stack 31 over the waveguide cores 38, 40, 42. In an embodiment, the waveguide core 48 may overlap with the waveguide core 40. The waveguide core 48 may be aligned along a longitudinal axis 45. In an embodiment, the longitudinal axis 45 of the waveguide core 48 may be aligned parallel to the longitudinal axes 35 of the waveguide cores 38, 40, 42. The waveguide core 48 may be truncated at opposite ends 49 such that the waveguide core 48 has a length. In an embodiment, the waveguide core 48 and the waveguide core 40 may have equal or substantially equal lengths. In an alternative embodiment, the waveguide core 48 may be shorter in length than the waveguide core 40.

The waveguide core 48 may be comprised of a dielectric material, such as silicon nitride, having a refractive index greater than the refractive index of silicon dioxide. In an embodiment, the waveguide core 48 may be formed by depositing a layer of its constituent material by chemical vapor deposition on the dielectric layer 46 and patterning the deposited layer by lithography and etching processes. In an embodiment, the waveguide core 48 may be comprised of the same dielectric material as the waveguide cores 38, 40, 42. In an embodiment, the waveguide core 48 may be comprised of a different dielectric material than the waveguide core 26. In an embodiment, the waveguide cores 38, 40, 42 may be comprised of a dielectric material that lacks carbon in its composition.

In alternative embodiments, the edge coupler may include additional waveguide cores in the level including the waveguide core 48. In alternative embodiments, the edge coupler may include additional waveguide cores in the level including the waveguide cores 38, 40, 42. In an alternative embodiment, a pair of the waveguide cores 38, 40, 42 may be eliminated in conjunction with additional waveguide cores being added in the level including the waveguide core 48.

Additional dielectric layers 56 (diagrammatically shown in dashed lines), including a dielectric layer 56 providing a moisture barrier, of the back-end-of-line stack 31 may be formed over the waveguide core 48.

Light (e.g., laser light) may be directed in a mode propagation direction 51 from a light source 50 toward the edge coupler. The light may have a given wavelength, intensity, mode shape, and mode size, and the edge coupler may provide spot size conversion for the light. In an embodiment, the light source 50 may be a single-mode optical fiber placed adjacent to the edge coupler. In an alternative embodiment, the light source 50 may be a semiconductor laser, and the semiconductor laser may be attached inside a cavity formed in the substrate 16.

The structure 10, in any of its embodiments described herein, may be integrated into a photonics chip that includes electronic components and additional optical components. For example, the electronic components may include field-effect transistors that are fabricated by CMOS processing.

The multiple-taper waveguide core 26 of the structure 10 may function to reduce conversion and propagation loss from leakage to the substrate 16, even in the absence of an undercut in the substrate 16 beneath the edge coupler. The coupling or leakage loss reduction provided by the waveguide core 26 may permit the elimination of an undercut as a leakage loss measure and may result in an undercut-free, solid substrate 16 beneath the edge coupler. Eliminating the undercut simplifies the process flow for forming the edge coupler, as well as potential mechanical issues resulting from removing a portion of the substrate 16 under the dielectric layer 14 and therefore eliminating a portion of the support beneath the edge coupler.

An edge coupler including the waveguide core 26 may also be characterized by a faster mode conversion, as well as a mode conversion characterized by fewer mode fluctuations. The structure 10 including the waveguide core 26 may also promote a reduction in the footprint of the edge coupler. In addition, the coupling losses for light of transverse electric and transverse magnetic polarization modes may be substantially equalized such that the coupling loss is substantially independent of the polarization mode.

Figure 9:
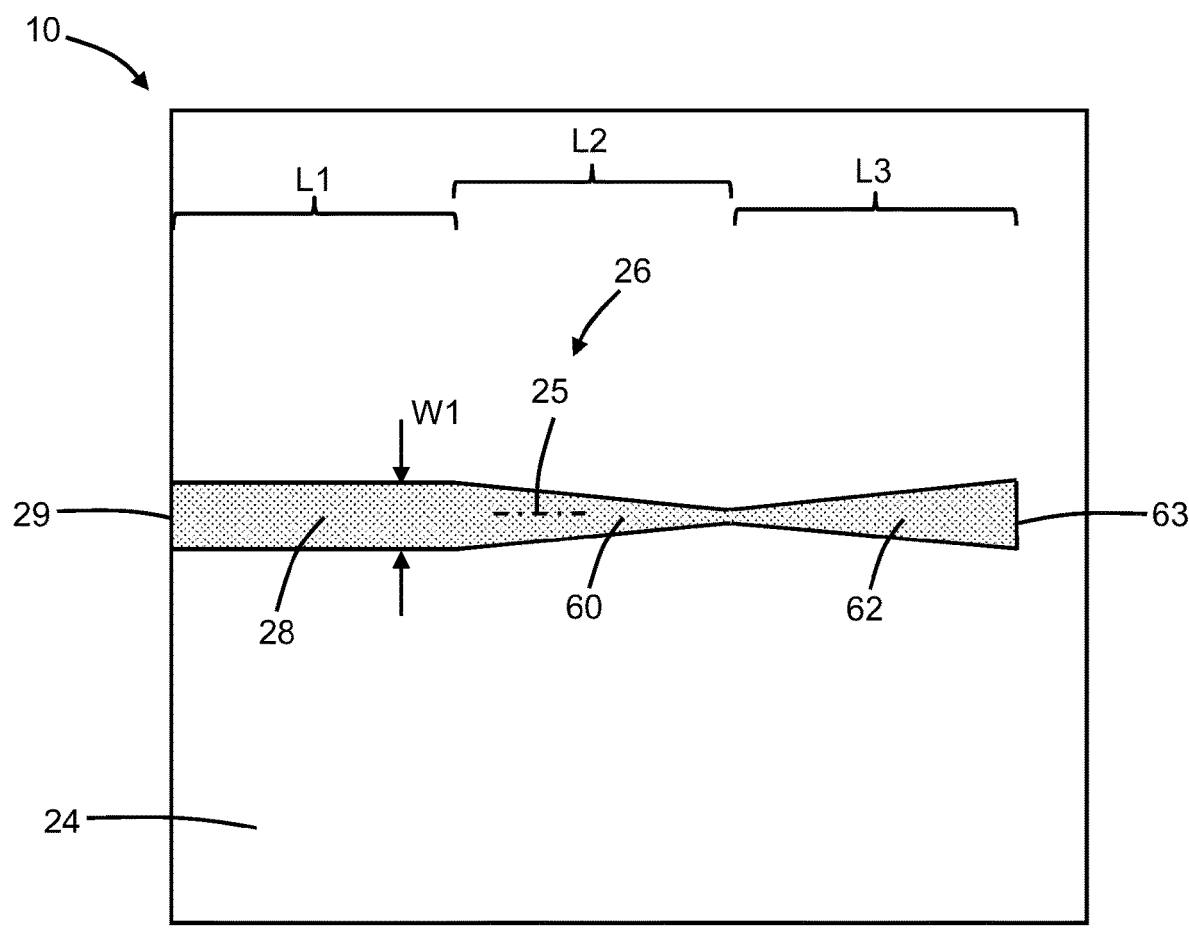
FIG. 9 is a top view of a structure in accordance with alternative embodiments of the invention.

With reference to FIG. 9 and in accordance with alternative embodiments of the invention, the multiple-taper waveguide core 26 may be modified to include a taper 60 and an inverse taper 62 that respectively replace the inverse taper 30 and the taper 32 and thereby alter the tapering variation of the waveguide core 26. The taper 60 connects the inverse taper 62 to the section 28. The inverse taper 62 has an end surface 63 that terminates the waveguide core 26. The width W1 of the waveguide core 26 varies over its total length between the end surface 29 and the end surface 33. The taper 60 may have the length L2 and the width W1 may decrease over the length L2 with increasing distance from the section 28, and the inverse taper 62 may have the length L3 and the width W1 may increase over the length L3 with increasing distance from the section 28.

The inverse taper 62 is longitudinally positioned adjacent to the taper 60 such that back-to-back or consecutive tapers are provided as sections of the waveguide core 26. In an embodiment, the inverse taper 62 may be adjoined to the taper 60. The inverse taper 62 tapers along the longitudinal axis 25 in an opposite direction from the tapering of the taper 60. In an embodiment, the inverse taper 62 of the waveguide core 26 may overlap with the inverse taper 18 of the waveguide core 12. In an embodiment, the inverse taper 62 of the waveguide core 26 and the inverse taper 18 of the waveguide core 12 may have equal lengths. In an embodiment, the inverse taper 62 of the waveguide core 26 may overlap with the inverse taper 18 of the waveguide core 12, and the inverse taper 62 of the waveguide core 26 and the inverse taper 18 of the waveguide core 12 may have equal lengths. In an embodiment, the inverse taper 62 of the waveguide core 26 may be centered over the inverse taper 18 of the waveguide core 12. In an embodiment, the inverse taper 62 of the waveguide core 26 and the inverse taper 18 of the waveguide core 12 may have different taper angles. For example, the taper angle of the inverse taper 62 may be greater than the taper angle of the inverse taper 18.

Reversing the tapering of the consecutive tapers by respectively replacing the inverse taper 30 and taper 32 with the taper 60 and inverse taper 62 may permit a change to the light mode conversion.

Figure 10:
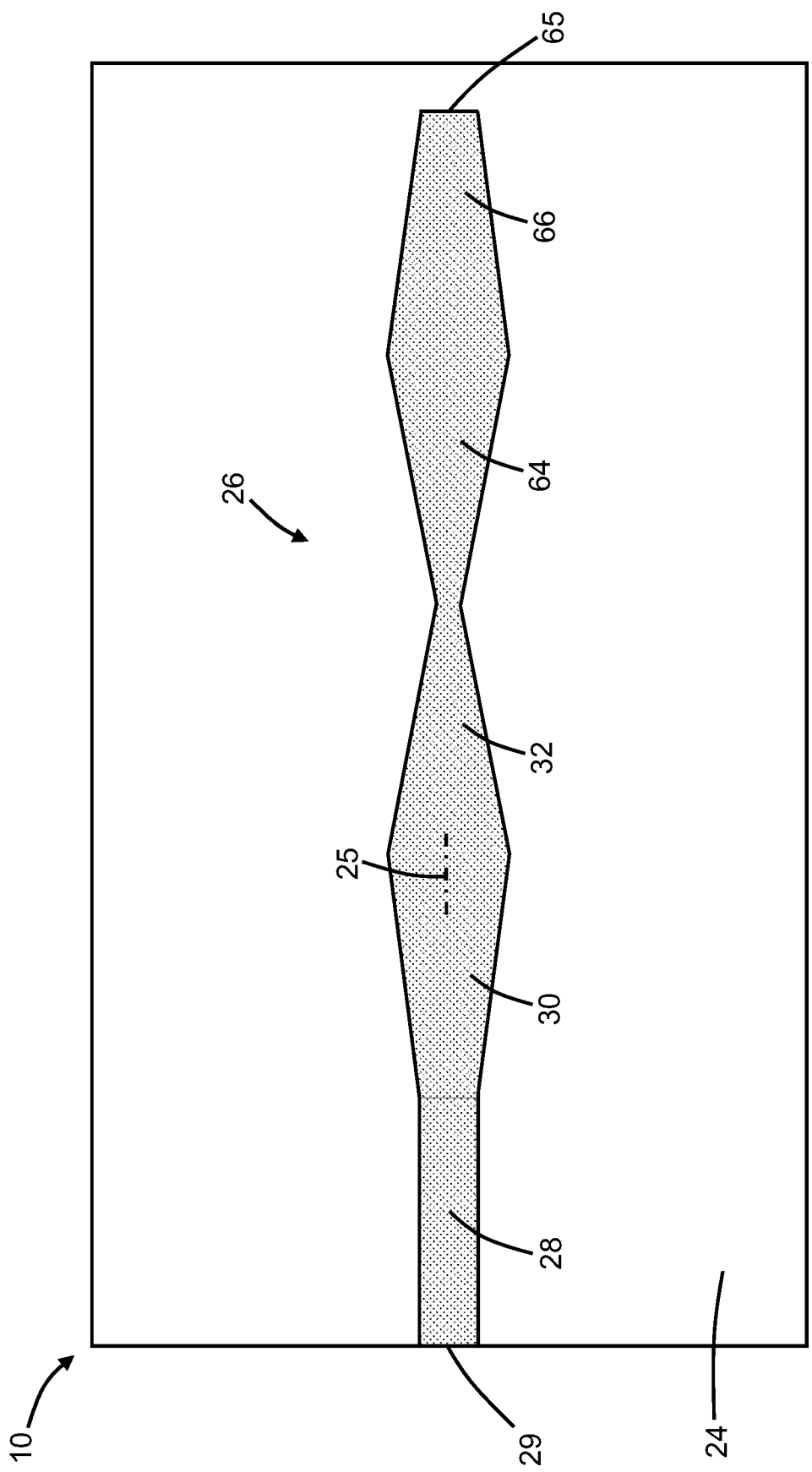
FIG. 10 is a top view of a structure in accordance with alternative embodiments of the invention.

With reference to FIG. 10 and in accordance with alternative embodiments of the invention, the multiple-taper waveguide core 26 may be modified to add an inverse taper 64 similar to inverse taper 30 and a taper 66 similar to the taper 32 as consecutively-arranged tapers defining sections of the waveguide core 26. The taper 66 has an end surface 65, which is opposite from the end surface 29, that terminates the modified waveguide core 26. The taper 66 may be adjoined to the inverse taper 64, the inverse taper 64 may be adjoined to the taper 32, and the taper 66 may be connected by the inverse taper 64 to the taper 32. The tapering of the inverse taper 64 along the longitudinal axis 25 is directionally opposite to the tapering of the taper 66. In an embodiment, the inverse taper 64 and the taper 66 of the waveguide core 26 may overlap with the section 20 of the waveguide core 12. In an embodiment, the inverse taper 64 and the taper 66 of the waveguide core 26 may be centered over the section 20 of the waveguide core 12.

In an embodiment, the inverse taper 64 and taper 66 may be concurrently formed along with the inverse taper 30 and taper 32. In an embodiment, the inverse taper 64 and taper 66 may be comprised of the same dielectric material as the inverse taper 30 and taper 32.

Figure 11:
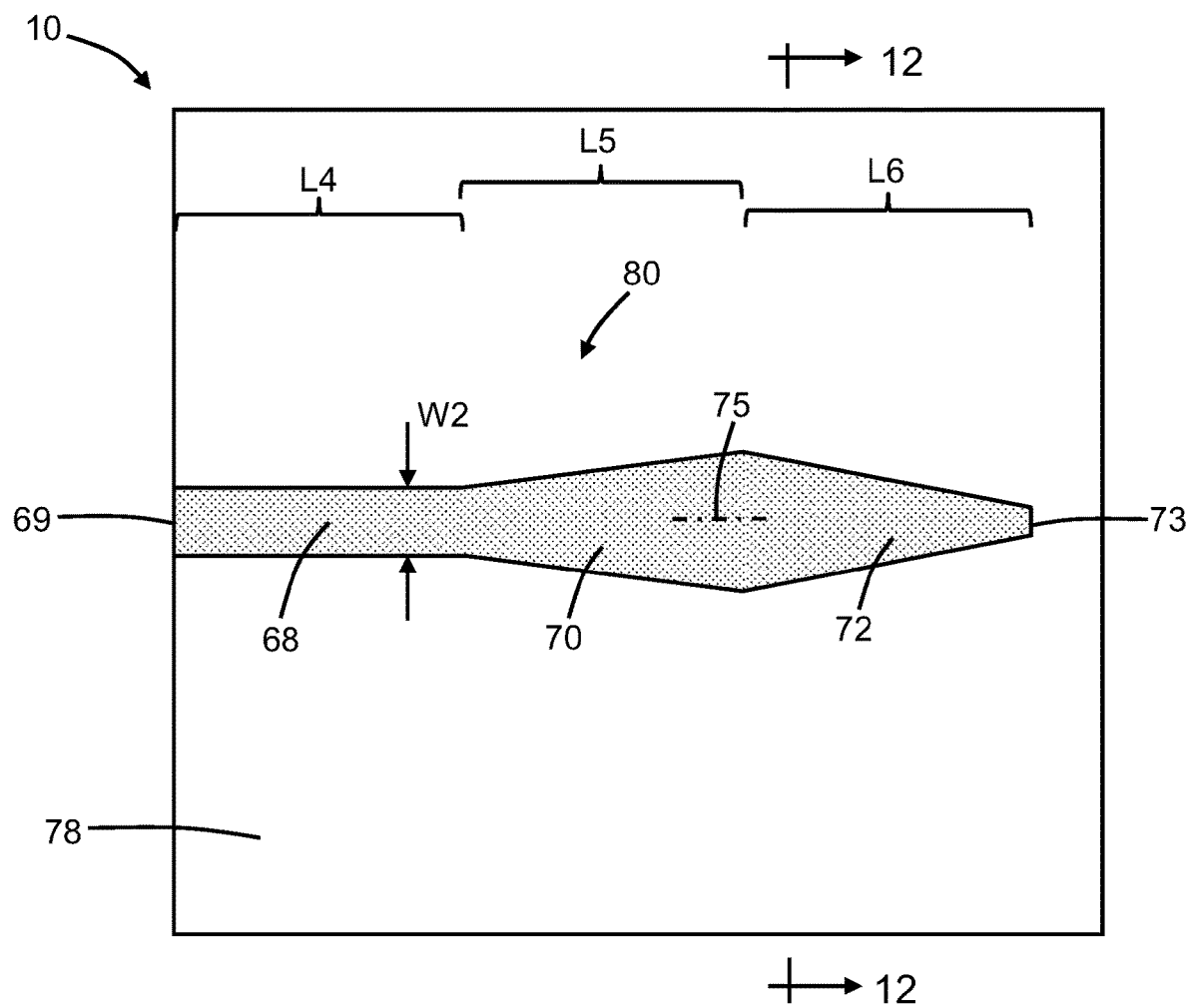
FIG. 11 is a top view of a structure at a fabrication stage of a processing method in accordance with alternative embodiments of the invention.
Figure 12:
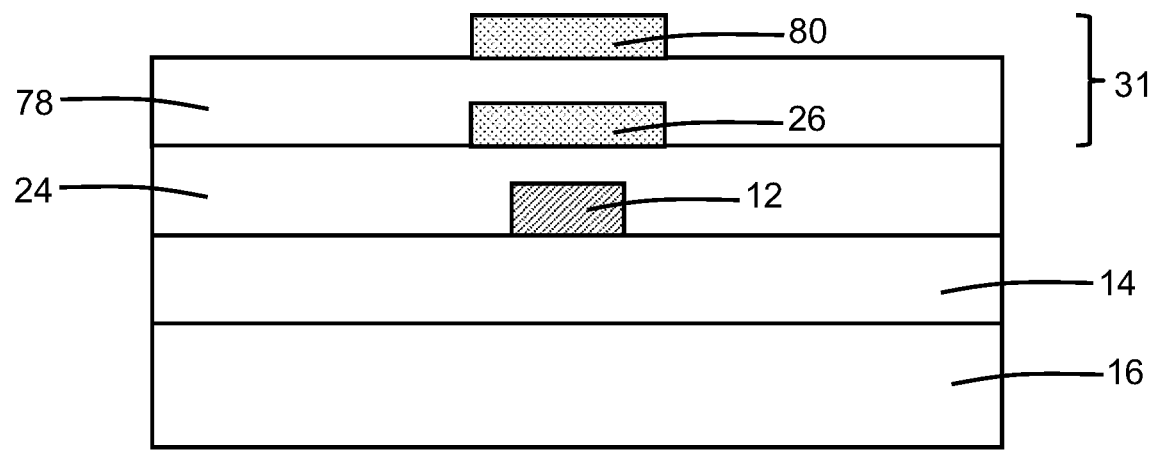
FIG. 12 is a cross-sectional view taken generally along line 12-12 in FIG. 11.

With reference to FIGS. 11, 12 and in accordance with alternative embodiments of the invention, a dielectric layer 78 may be formed over the waveguide core 26. The dielectric layer 78 may be comprised of a dielectric material, such as silicon dioxide. The waveguide core 26 is embedded in the dielectric layer 78 because the dielectric layer 78 is thicker than the height of the waveguide core 26. The thickness of the dielectric layer 78 and the height of the waveguide core 26 may be adjustable variables. The dielectric material constituting the dielectric layer 78 may have a lower refractive index than the material constituting the waveguide core 26.

A waveguide core 80 may be added to the structure 10 and may be positioned in a level of the back-end-of-line stack 31 between the level including the waveguide core 26 and the level including the waveguide cores 38, 40, 42. The waveguide core 80 may include a section 68, an inverse taper 70, and a taper 72 connected by the inverse taper 70 to the section 68. The section 68 has an end surface 69 that terminates the waveguide core 80 and the taper 72 also has an end surface 73 that terminates the waveguide core 80. The waveguide core 80 has a width W2 that varies over its total length between the end surface 69 and the end surface 73. The section 68 may have a length L4 and the width W2 may be constant over the length L4, the inverse taper 70 may have a length L5 and the width W2 may increase over the length L5 with increasing distance from the section 68, and the taper 72 may have a length L6 and the width W2 may decrease over the length L6 with increasing distance from the section 68. The total length of the waveguide core 80 may be equal to the sum of the length L4, the length L5, and the length L6. In an embodiment, the individual lengths L4, L5, L6 may be respectively equal or substantially equal to the individual lengths L1, L2, L3 of the waveguide core 26.

The waveguide core 80 may be comprised of a dielectric material, such as silicon-carbon nitride or hydrogenated silicon-carbon nitride, having a refractive index greater than the refractive index of silicon dioxide. In an embodiment, the waveguide core 80 may be formed by depositing a layer of its constituent material by chemical vapor deposition on the dielectric layer 78 and patterning the deposited layer by lithography and etching processes. In an alternative embodiment, the waveguide core 80 may be comprised of silicon nitride or silicon oxynitride. In an embodiment, the waveguide core 26 and the waveguide core 80 may be comprised of the same dielectric material.

The inverse taper 70 is longitudinally positioned adjacent to the taper 72 such that back-to-back or consecutive tapers are provided as sections of the waveguide core 80. In an embodiment, the inverse taper 70 may be adjoined to the taper 72. The waveguide core 80 may be aligned along a longitudinal axis 75. The tapering of the inverse taper 70 along the longitudinal axis 75 is directionally opposite to the tapering of the taper 72. In an embodiment, the longitudinal axis 75 may be aligned parallel to the longitudinal axis 25 of the waveguide core 26.

In an embodiment, the taper 72 of the waveguide core 80 may overlap with the taper 32 of the waveguide core 26, and both tapers 32, 72 may overlap with the inverse taper 18 of the waveguide core 12. In an embodiment, the tapers 32, 72 and the inverse taper 18 of the waveguide core 12 may have equal lengths. In an embodiment, the section 68 of the waveguide core 80 may overlap with the section 28 of the waveguide core 26, and the inverse taper 70 of the waveguide core 80 may overlap with the inverse taper 30 of the waveguide core 26. In an embodiment, the taper 72 of the waveguide core 80 may be centered over the taper 32 of the waveguide core 26.

Figure 13:
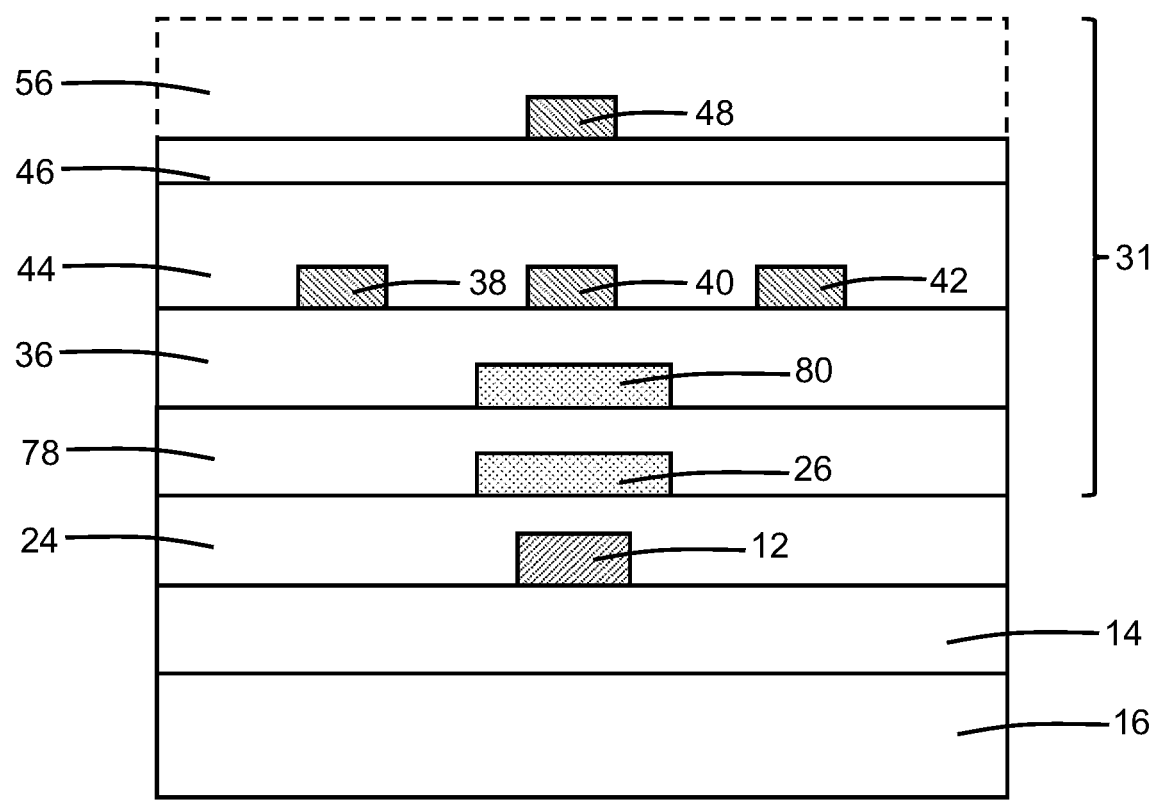
FIG. 13 is a cross-sectional view of the structure at a fabrication stage of the processing method subsequent to FIG. 12.

With reference to FIG. 13 in which like reference numerals refer to like features in FIG. 12 and at a subsequent fabrication stage, the process continues as described above to complete the structure 10 that includes the added waveguide core 80.

Figure 14:
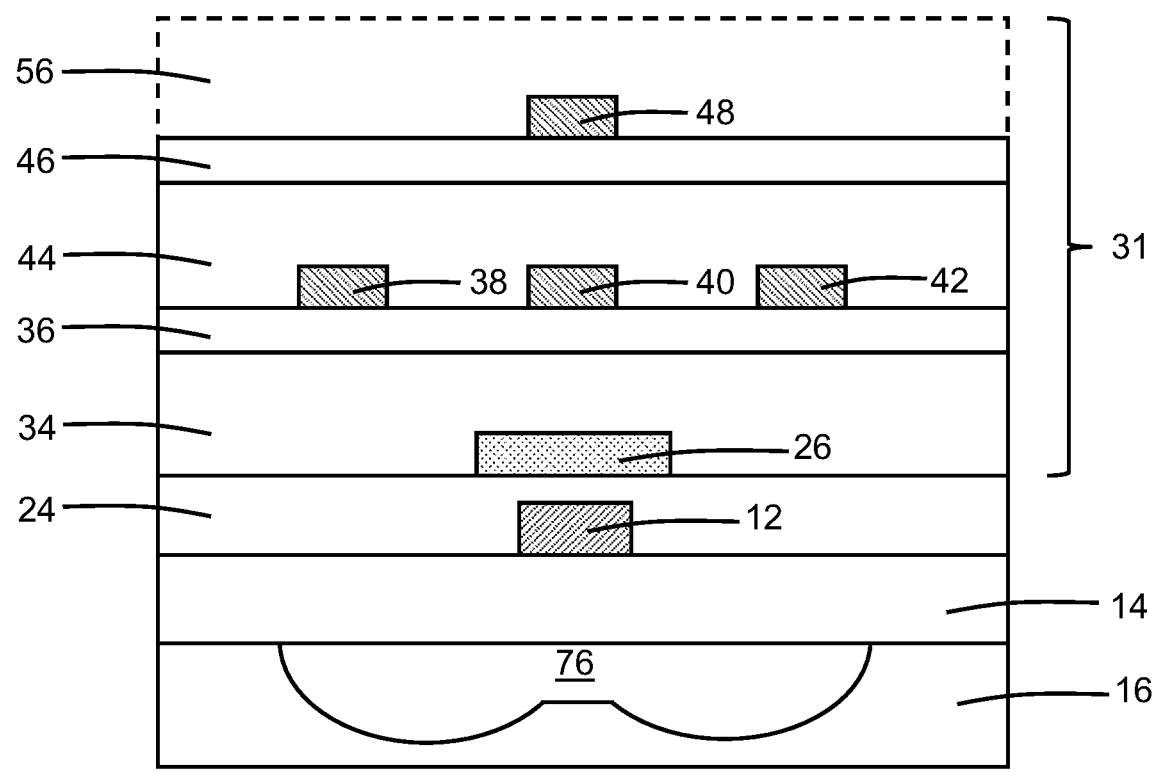
FIG. 14 is a cross-sectional view of a structure in accordance with alternative embodiments of the invention.

With reference to FIG. 14 and in accordance with alternative embodiments of the invention, an undercut 76 may be formed in the substrate 16 beneath the waveguide core 12. The undercut 76 may be formed by patterning pilot openings penetrating through the dielectric layer 14, and then etching the substrate 16 with access provided by the pilot openings using an isotropic etching process characterized by both lateral and vertical etching components. The undercut 76 may provide additional reductions in the leakage loss to the substrate 16.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:
   a substrate;
   a first waveguide core; and
   a second waveguide core positioned in a vertical direction between the substrate and the first waveguide core, the second waveguide core including a first section, a first taper and a first inverse taper longitudinally positioned between the first taper and the first section, the first taper terminating at a first end surface, the first inverse taper having a first width that increases with increasing distance from the first section, the first taper having a second width that decreases with increasing distance from the first section, and the first section terminating at a second end surface that is configured to receive light directed in a mode propagation direction from a light source disposed adjacent to the edge coupler,
   wherein the first waveguide core overlaps with the first section, the first taper, and the first inverse taper of the second waveguide core.

2. The structure of claim 1 wherein the first taper of the second waveguide core is adjoined to the first inverse taper of the second waveguide core.

3. The structure of claim 1 further comprising:
   a third waveguide core,
   wherein the second waveguide core is positioned in the vertical direction between the third waveguide core and the substrate.

4. The structure of claim 3 wherein the third waveguide core includes a second section, a second taper, and a second inverse taper longitudinally positioned between the second taper and the second section, and the first taper of the third waveguide core overlaps with the first taper of the first waveguide core.

5. The structure of claim 4 wherein the second taper of the third waveguide core overlaps with the second taper of the third waveguide core.

6. The structure of claim 5 wherein the second inverse taper of the third waveguide core overlaps with the first inverse taper of the second waveguide core.

7. The structure of claim 6 wherein the second section of the third waveguide core overlaps with the first section of the second waveguide core.

8. The structure of claim 1 wherein the first inverse taper of the second waveguide core is longitudinally positioned between the first taper and the second end surface.

9. The structure of claim 1 wherein the first section of the second waveguide core is longitudinally positioned between the first inverse taper and the first end surface.

10. The structure of claim 1 wherein the second waveguide core includes a second taper and a second inverse taper.

11. The structure of claim 1 wherein the first waveguide core comprises silicon nitride, and the second waveguide core comprises silicon-carbon nitride or hydrogenated silicon-carbon nitride.

12. The structure of claim 1 wherein the first waveguide core comprises silicon nitride, and the second waveguide core comprises silicon nitride or silicon oxynitride.

13. The structure of claim 1 wherein the substrate includes an undercut, and the first waveguide core and the second waveguide core have an overlapping arrangement with the undercut in the substrate.

14. The structure of claim 1 wherein the substrate is solid beneath the first waveguide core and the second waveguide core.

15. A structure for an edge coupler, the structure comprising:
    a substrate;
    a first waveguide core;
    a second waveguide core positioned in a vertical direction between the substrate and the first waveguide core, the second waveguide core including a section, a taper, and an inverse taper longitudinally positioned between the taper and the section, the taper terminating at a first end surface, the inverse taper having a first width that increases with increasing distance from the section, the taper having a second width that decreases with increasing distance from the section, and the section terminating at a second end; and
    a third waveguide core positioned in a lateral direction adjacent to the first waveguide core,
    wherein the first waveguide core overlaps with the section, the taper, and the inverse taper of the second waveguide core.

16. A method of forming a structure for an edge coupler, the method comprising:
    forming a first waveguide core; and
    forming a second waveguide core positioned in a vertical direction between the first waveguide core and a substrate, wherein the second waveguide core including a section, a taper, and an inverse taper longitudinally positioned between the taper and the section, the taper terminates at a first end surface, the inverse taper has a first width that increases with increasing distance from the section, the taper has a second width that decreases with increasing distance from the section, and the section terminates at a second end surface that is configured to receive light directed in a mode propagation direction from a light source disposed adjacent to the edge coupler, wherein the first waveguide core overlaps with the section, the taper, and the inverse taper of the second waveguide core.

17. The method of claim 16 wherein the inverse taper of the second waveguide core is longitudinally positioned between the taper and the second end surface.

18. The method of claim 16 wherein the taper of the second waveguide core is longitudinally positioned between the inverse taper and the first end surface.

19. The structure of claim 1 wherein the first taper of the second waveguide core and the first inverse taper of the second waveguide core are consecutively arranged.

* * * * *